April 11, 1961 A. N. BLAND ET AL 2,979,171
CLUTCH OPERATING MECHANISM FOR MOTOR VEHICLES
Filed March 24, 1958 5 Sheets-Sheet 1

INVENTORS
Albert Norman Bland
David Aubrey Davies
BY
Stevens, Davis, Miller & Mosher
their ATTORNEYS

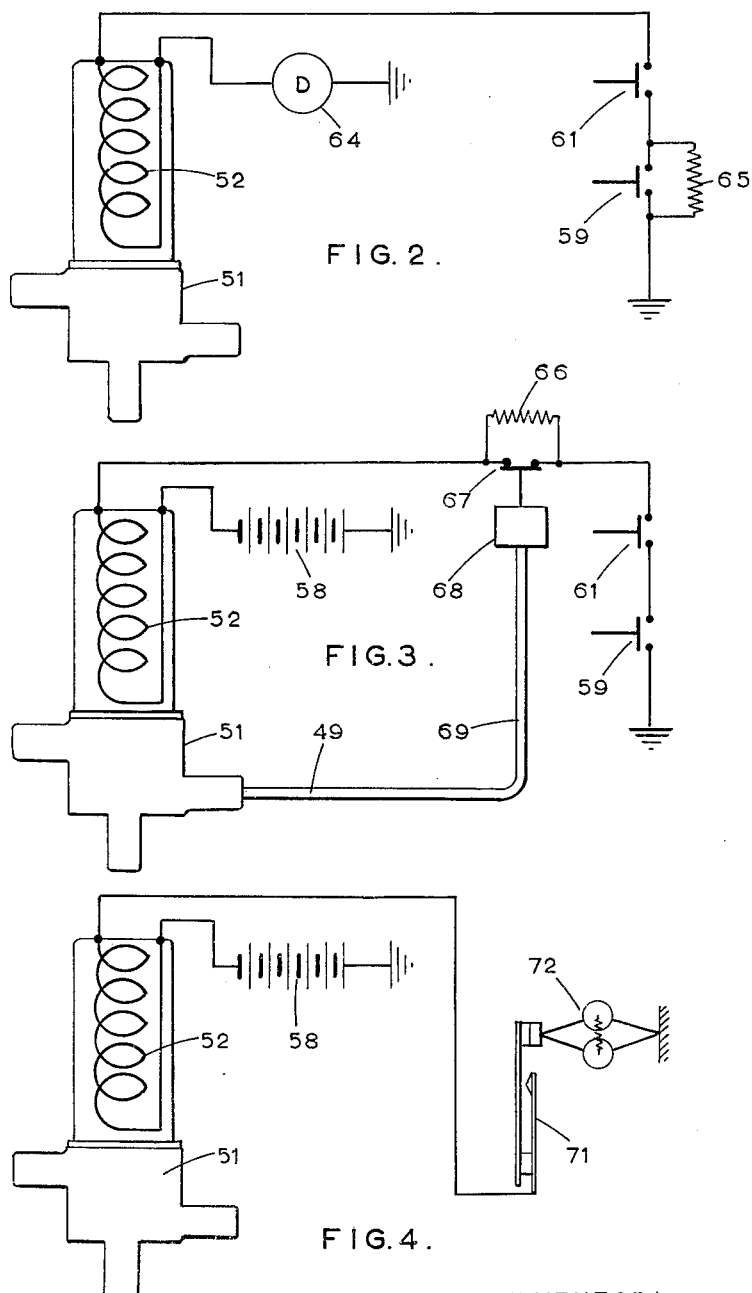

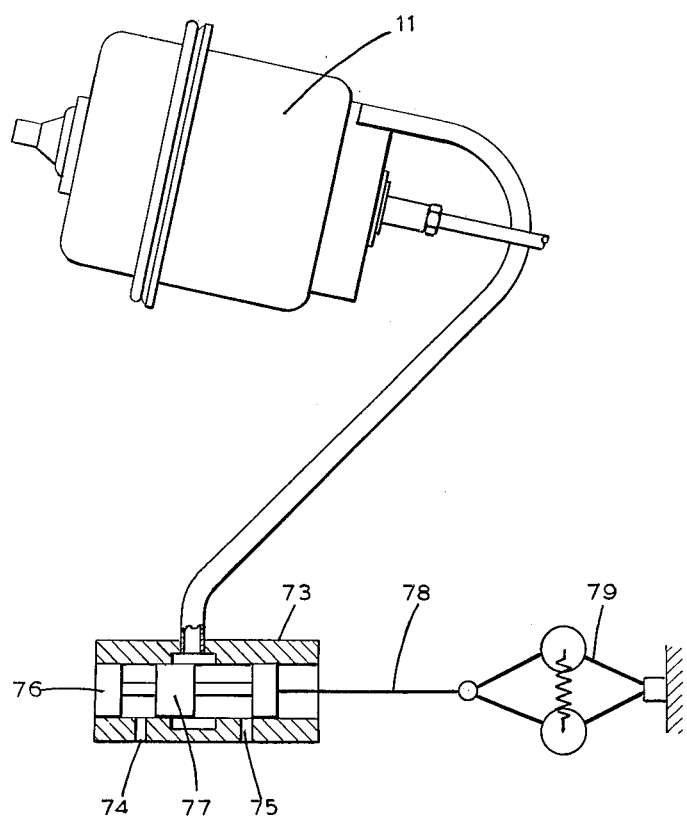

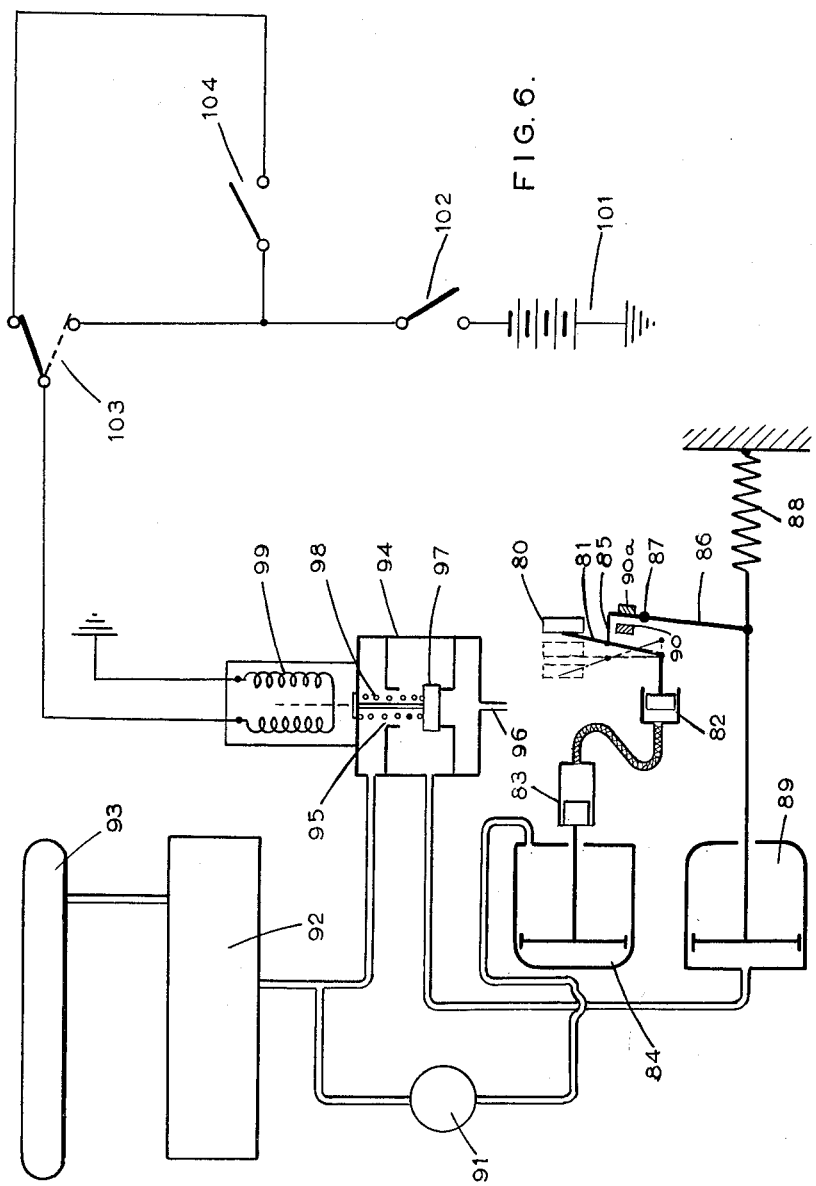

United States Patent Office 2,979,171
Patented Apr. 11, 1961

2,979,171

CLUTCH OPERATING MECHANISM FOR MOTOR VEHICLES

Albert Norman Bland and David Aubrey Davies, Leamington Spa, England, assignors to Automotive Products Company Limited, Leamington Spa, England Filed Mar. 24, 1958, Ser. No. 723,420

Claims priority, application Great Britain Mar. 27, 1957

14 Claims. (Cl. 192—.052)

This invention relates to clutch operating mechanism for motor vehicles, and more particularly to operating mechanism for friction clutches of the centrifugal type.

The use of a centrifugal clutch in a motor vehicle provides automatic take-up of the drive as the engine is speeded up, but has the disadvantage that, as the initial engagement of the clutch takes place only at an engine speed exceeding a minimum depending on the characteristics of the clutch, and full engagement is not achieved until the speed reaches a somewhat higher value, the engine cannot be started by towing the vehicle, and there is a risk of excessive clutch slip, and consequent wear, if the vehicle is driven for long distances with the engine turning slowly.

A type of centrifugal clutch is known in which the pressure plate is urged towards the driven plate by the combined action of springs and centrifugal weights, the springs being normally held against extension beyond a predetermined limit such that, when the centrifugal weights are inoperative, the pressure plate exerts no pressure on the driven plate, the centrifugal weights, when actuated by centrifugal force, compressing the springs and causing a thrust, varying with the degree of compression of the springs, to be applied to the pressure plate. A convenient example of such a clutch comprises springs acting between a cover plate or equivalent fixed abutment and a reaction plate, and centrifugal weights acting between the reaction plate and the pressure plate. If the springs are allowed to extend beyond their normal limit, they are able to engage the clutch without the assistance of the centrifugal weights.

The object of the present invention is to provide a clutch operating mechanism for a clutch of the kind referred to, which mechanism is capable of releasing the clutch at will under all conditions, and is also arranged to ensure positive engagement of the clutch, independently of the centrifugal weights, under certain predetermined conditions.

According to the present invention, in clutch operating mechanism for a motor vehicle having a centrifugal clutch of the kind referred to and including release levers acting on the reaction plate, said mechanism comprising a release bearing co-operating with the release levers and actuating means for moving the release bearing in a direction to compress the clutch springs, means acting, when the vehicle speed is low, to prevent the release bearing from moving, in a direction to extend the clutch springs, beyond a position such that the clutch is engageable only by operation of the centrifugal weights, are automatically rendered inoperative by increasing the vehicle speed, to allow further extension of the said clutch springs.

The said means may be responsive to the action of a centrifugal governor driven by the vehicle trannmission, to the current produced by an electric generator driven by the vehicle engine, or to movement of an engie throttle pedal or equivalet control member.

Gear ratio selection means on the vehicle may be coupled to an overriding control device for the said means whereby said means are rendered inoperative only when predetermined gears are selected.

Further, according to the invention, in clutch operating mechanism for a motor vehicle having a centrifugal clutch of the kind referred to and including release levers acting on the reaction plate, said mechanism comprising a release bearing co-operating with the release levers and actuating means for moving the release bearing in a direction to compress the clutch springs, the stroke of the servo-motor in the direction to extend the clutch springs is limited by a stop member supported, by spring means strong enough to overcome the clutch springs, in a position such that the clutch is engageable only by operation of the centrifugal weights, power means to retract said stop and allow further extension of the clutch springs being brought into operation by means sensitive to the vehicle speed, or controlled in common with the vehicle speed, as the said speed increases.

Further, according to the invention, in clutch operating mechanism for a motor vehicle having a centrifugal clutch of the kind referred to and including release levers acting on the reaction plate, said mechanism comprising a release bearing co-operating with the release levers and actuating means for moving the release bearing in a direction to compress the clutch springs, the servo-motor is connected to the release bearing by a linkage includig a lever having a movable fulcrum, means being provided to hold the said fulcrum in a position such that, when the servo-motor is inoperative, the release bearing is held in a position such that the clutch is engageable only by the centrifugal weights, power means being provided to move said fulcrum in such a way that, without movement of the servo-motor, the release bearing is moved to allow further extension of the clutch springs, said power means being brought into operation by means sensitive to the vehicle speed, or controlled in common with the vehicle speed, as the said speed increases.

The invention is hereinafter described with reference to the accompanying drawings, which are largely diagrammatic, and in which:

Figure 2 is a diagram showing another arrangement for controlling the solenoid-operated valve of the mechanism shown in Figure 1;

Figure 3 is a diagram, similar to Figure 2, showing another arrangement for controlling the solenoid-operated valve;

Figure 4 is another diagram similar to Figure 2, showing another arrangement for controlling the solenoid-operated valve;

Figure 5 is a diagram similar to part of Figure 1 showing a governor operated valve in place of the solenoid-operated valve; and Figure 6 is a diagram showing another clutch operating mechanism embodying the invention.

Figure 1:
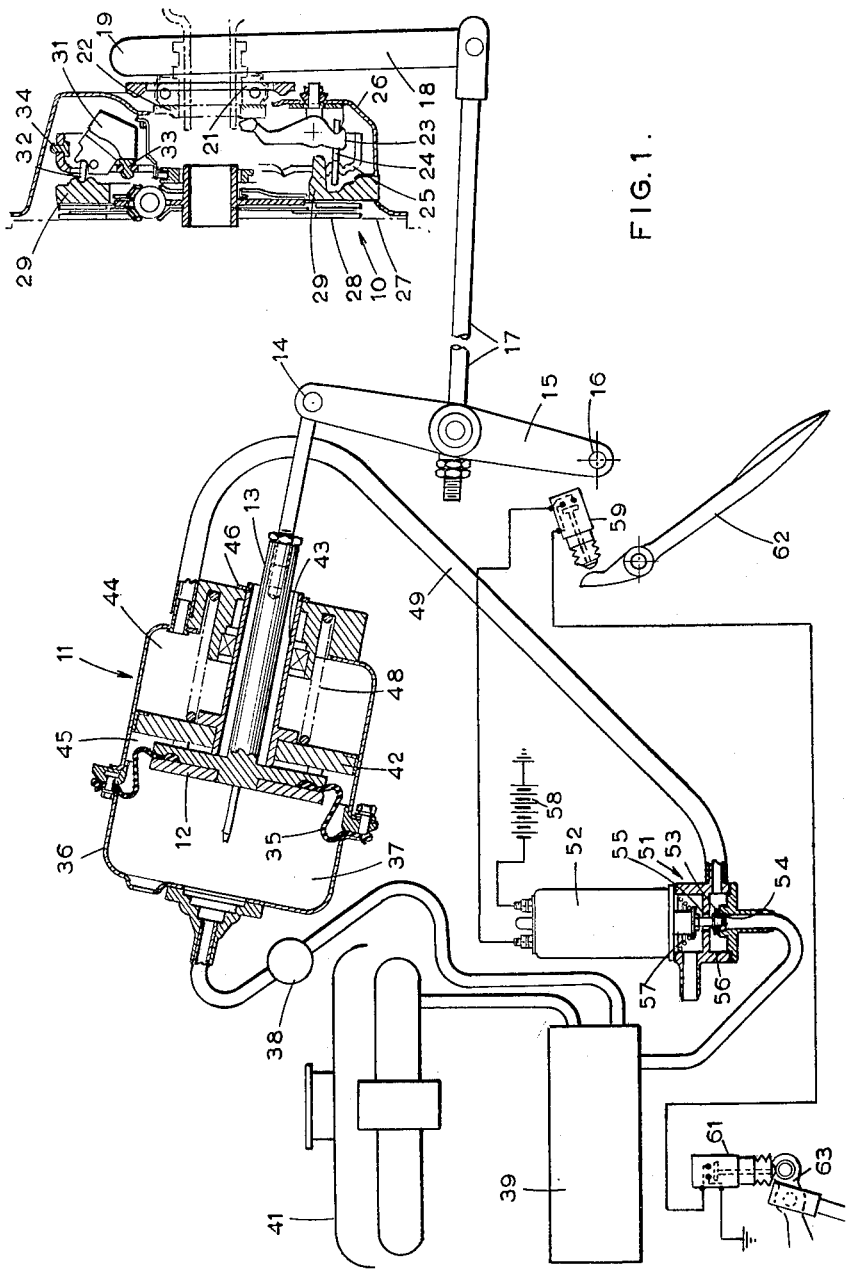
Figure 1 is a diagram of a clutch operating mechanism embodying the invention, some of the structures included in the system being shown in section.
Figure 1A:
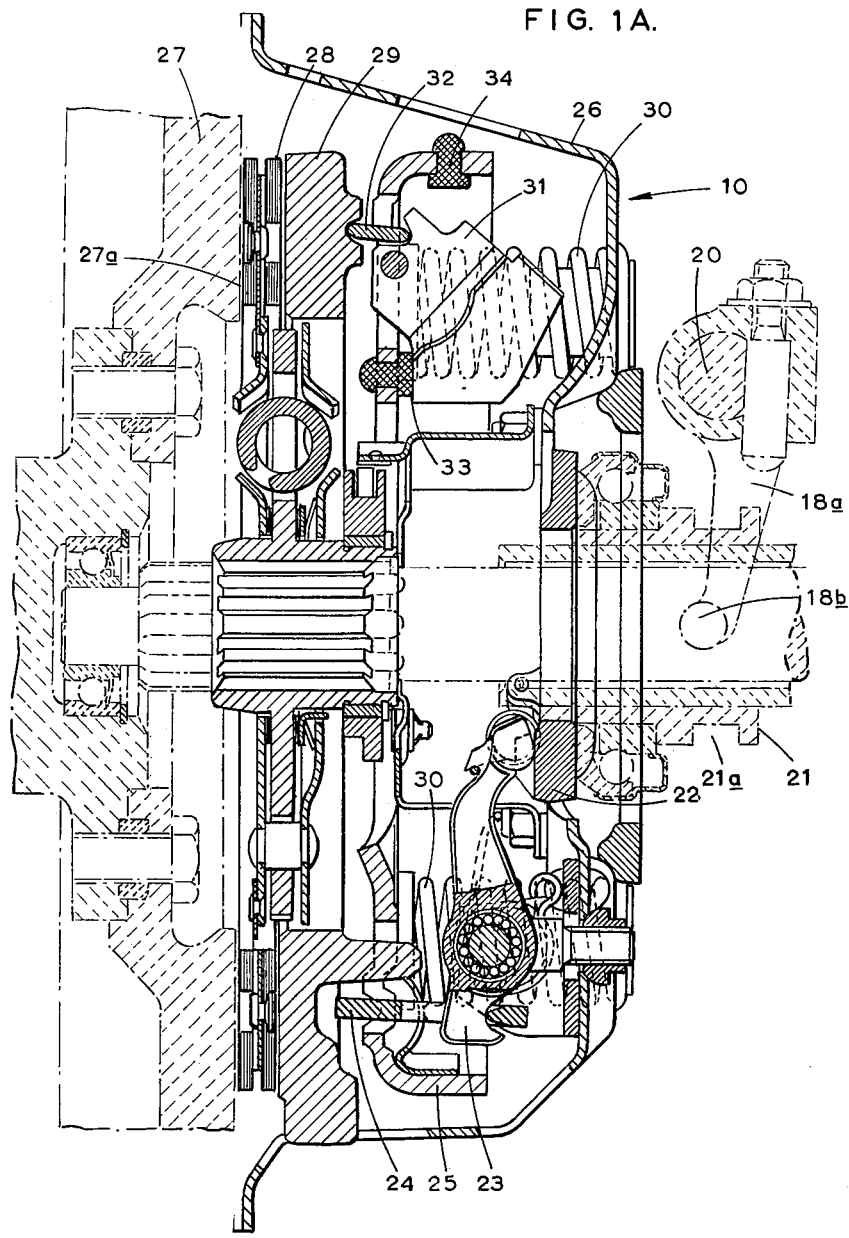
Figure 1A is an enlarged sectional elevational view of the clutch shown in Figure 1.

Referring to Figure 1, a friction clutch of the centrifugal type is shown at 10, and a vacuum servo-motor at 11, a movable member 12 in the servo-motor 11 being mounted on a rod 13 which is pivotally connected at 14 to a lever 15 having a fixed fulcrum at 16 and is in turn connected by a pivoted link 17 to a clutch throw-out lever 18 fulcrummed at 19. The throw-out lever 18 is fixed on a shaft 20 (Figure 1A) which also has fixed to it a throw-out fork 18a, having trunnions 18b which engage in a circumferential groove 21a in a release bearing 21. The release bearing 21 cooperates with a release-lever plate 22 acting on the inner ends of radial release levers 23 mounted in the clutch, the release levers, at their outer ends, being connected by links 24 to a reaction plate 25. The reaction plate 25 is urged by springs 30 abutting against a cover plate 26, towards a driving face 27a on a flywheel 27 to which the cover plate 26 is bolted. A driven plate 28 is mounted between the flywheel 27 and a pressure plate 29, the pressure plate being between the driven plate 28 and the reaction plate 25, and centrifugally-operated weights 31 mounted on the reaction plate act through struts 32 on the pressure plate so that, when the said weights are subjected to centrifugal force due to rotation of the clutch, the pressure plate 29 and the reaction plate 25 are urged apart.

It will be apparent that the position of the reaction plate 25 relative to the flywheel is changed by movement of the release bearing 21 and that, if the said release bearing 21 is moved far enough away from the flywheel (to the right in Figures 1 and 1A), the clutch springs 30 are able themselves to engage the clutch, the thrust being transmitted through stops 33 to the centrifugal weights 31 and thence through the struts 32 to the pressure plate.

If the release bearing 21 is moved somewhat nearer to the flywheel, the reaction plate 25 is pulled back until, with the centrifugal weights 31 held against the stops 33 by return springs (not shown) the pressure plate 29 is moved away from the driven plate 28, and the clutch can be engaged only by centrifugal force produced by rotation and causing the centrifugal weights 31 to swing out towards positions in which they engage with stops 34.

Still further movement of the release bearing towards the flywheel pulls the reaction plate 25 further back to a position in which, even with the weights 31 in engagement with the stops 34, the clutch remains disengaged.

The movable member 12 of the servo-motor 11 consists of a rigid disc assembly forming the centre of a flexible diaphragm 35 dividing the cylinder 36 of the servo-motor into two chambers. The chamber 37 on the side of the diaphragm 35 opposite to that from which the rod 13 extends is connected to a control valve, shown diagrammatically at 38, through which the said chamber is normally connected to the atmosphere but can, at will, be connected to a vacuum reservoir 39 which is in turn connected to a source of suction such as the inlet manifold 41 of the engine of a vehicle in which the clutch-operating system is mounted.

In the chamber of the servo-motor 11 on the side of the diaphragm from which the rod 13 extends, there is mounted a piston 42 having fixed to it a sleeve 43 which surrounds the rod 13 and extends through the adjacent end of the cylinder so as to divide the said chamber into two parts, namely, a closed annular sub-chamber 44 and a sub-chamber 45 between the diaphragm 35 and the piston 42 which is open to the atmosphere. The sleeve 43 has a resilient stop ring 46 engaged in an external groove adjacent its outer end, and a coiled compression spring 48 surrounding the sleeve 43 urges the piston inwardly to cause the stop ring to abut against the end of the servo-motor cylinder. The linkage 15, 17, 18 is so adjusted that when the stop ring 46 is in engagement with the end of the cylinder 36 and the movable member 12 is in engagement with the piston 42, the release bearing 21 is held in the position such that the clutch springs are unable to engage the clutch directly, but the clutch can engage under centrifugal action. The spring 48 is of such strength that it is able to hold the release bearing against the load of the clutch springs. Connection of the servo-motor chamber 37 to vacuum moves the release bearing to further retract the reaction plate 25 and disengage the clutch even if it is under the influence of centrifugal force, whilst connection of the sub-chamber 44 to vacuum causes the spring 48 to be compressed and allows the reaction plate 25 to move towards the flywheel, thus causing the clutch to be fully engaged by the springs 30 acting on the said reaction plate.

The sub-chamber 44 is connected, by a conduit 49, to a valve 51 actuated by a solenoid 52, the valve 51 comprising a head 53 movable between seats surrounding ports 54 and 55 on opposite sides of a chamber 56 into which the conduit 49 leads, the port 54 being connected to the vacuum reservoir 39 and the port 55 being connected to the atmosphere. The valve head 53 is normally urged towards the seat surrounding the port 54 by a spring 57, the solenoid, when energised, moving the valve head on to the seat surrounding the port 55, so that vacuum is applied to the sub-chamber 44.

It will thus be seen that, when it is desired to ensure full engagement of the clutch regardless of the degree of centrifugal force being exerted, the solenoid 52 must be energised, and, in the arrangement of Figure 1, this is done by closing switches dependent on the position of certain of the vehicle controls, in the following manner. An electrical circuit including the solenoid 52 includes also a battery 58 and two switches 59 and 61 both biassed to open positions. The switch 59 is arranged to be closed by a predetermined movement, from a "throttle closed" position, of a throttle control pedal 62, and the switch 61 is arranged to be closed by the selector mechanism of the vehicle gearbox, part of which is shown at 63, when chosen gear ratios, usually third and top gears, are selected. Thus, when either of those gears is selected, and the throttle is opened, the clutch is fully engaged by the springs 30, and is not liable to slip due to the presence of insufficient centrifugal force acting on the weights, whereas at all other times the clutch is under the control of the centrifugal weights, and is engaged and disengaged automatically due to variations in the engine speed.

Figures 2, 3 and 4 show alternative control circuits for the solenoid 52 associated with the valve 51.

In Figure 2, the circuit includes switches 59 and 61 as described with reference to Figure 1, but the battery 58 is replaced by an electric generator 64, conveniently the generator used to supply current for other purposes on the vehicle, and a resistance 65 is mounted across the contacts of the switch 59. The resistance has a value such that current flowing through it when the switch 59 is open cannot operate the solenoid 52, but is sufficient to hold the solenoid in the operated position if it has already been moved to that position. Thus, the solenoid is operated only by selection of an appropriate gear ratio, opening of the engine throttle, and the attainment of an engine speed such that the generator produces a predetermined current, but remains in the operated position so long as the appropriate gear is engaged and the engine speed remains above the predetermined value, even if the throttle is closed.

The switch 59 and resistance 65 may be omitted, so that the generator provides the sole control related to speed, and, if the elimination of centrifugal clutch control is required on all gears, the switch 61 may also be omitted.

In Figure 3 the solenoid 52 is connected in circuit with a battery 58 and switches 59 and 61 as in Figure 1, and a resistance 66, capable of being short-circuited by a switch 67, is included in the circuit. The switch 67 is normally closed, but is urged to the open position by suction in an actuator 68 connected to a branch 69 of the conduit 49 so as to be subjected to suction simultaneously with the sub-chamber 44 of the servo-motor. The resistance 66 is of such a value that it reduces the current in the circuit to a value at which the solenoid 52 is held in the operated position but cannot be operated from its other position, and thus reduces the current consumption of the mechanism.

In Figure 4 the circuit which includes the solenoid 52 also includes a battery 58 and a switch 71 controlled by a centrifugal governor 72 driven by the vehicle transmission so as to rotate at a speed proportional to the road speed. The switch 71 is open when the vehicle is stationary, and is closed by the action of the centrigual governor when a predetermined road speed is reached, so that the clutch is fully spring engaged at all road speeds above the predetermined speed.

The switch 71 may be normally closed instead of being normally open, the solenoid 52 acting to move the valve 51 to open the atmosphere port instead of the vacuum port therein. A further switch is then included in the circuit, which is conveniently the vehicle ignition switch, to open the circuit when the vehicle is not in use.

The solenoid-operated valve 51 may be replaced by a valve operated directly by speed-responsive means such as a centrifugal governor, and in Figure 5 there is shown the servo-motor 11, which is conveniently connected to the clutch as shown in Figure 1, together with a piston-type slide valve 73 arranged to connect the conduit 49 to a port 74 in the valve body which is itself connected to the vacuum reservoir, or to connect the said conduit 49 to a port 75 leading to the atmosphere. The valve 73 has a spool 76 formed with two circumferential grooves separated by a land 77, and the said spool is connected by a rod 78 to a centrifugal governor 79 driven by the vehicle transmission so as to rotate at a speed proportional to the road speed. When the governor is not rotating, or is rotating at a speed below a predetermined value, the spool is in the position shown in Figure 5, and connects the sub-chamber 44 (Figure 1) in the servo-motor to the atmosphere, but, when the governor rotates at a higher speed, the outward movement of the governor weights causes the spool to move to a position in which it connects the sub-chamber 44 to suction, so that the piston 42 is moved against the spring 48 and the clutch is fully engaged independently of the centrifugal weights.

Figure 6 shows an embodiment of the invention in which the positioning of the clutch release bearing when the main clutch releasing servo-motor is inoperative is determined by the position of the fulcrum of a lever, conveniently the clutch throw-out lever. Referring to Figure 6, which is diagrammatic, the clutch release bearing is indicated at 80, the rest of the clutch being omitted. The throw-out lever 81, which is actuated by the slave cylinder 82 of a liquid pressure transmission system the master cylinder 83 of which is actuated by a vacuum servo-motor 84, is fulcrummed on a link 85 which is in turn pivoted to a lever 86 having a fixed fulcrum at 87. The lever 86 is acted on by a tension spring 88 which tends to move it so as to displace the fulcrum of the throw-out lever 81 in a direction to move it about its connection to the slave cylinder 82 and move the clutch release bearing 79 towards the clutch flywheel, and a second vacuum servo-motor 89 acts in the opposite direction on the said lever 86 to overcome the spring 88 and move the release bearing in the opposite direction. The movement of the lever 86 is limited by stops 90, 90a, so that, when under the influence of the spring 88 it engages the stop 90 holds the fulcrum of the throw-out lever 81 in a position such that the clutch is engageable only by the centrifugal weights, and when the servo-motor 89 is operated, the lever 86 is moved into engagement with the stop 90a and holds the fulcrum of the throw-out lever in a position to allow full engagement of the clutch by its own springs.

The servo-motor 84 is connected, through a valve indicated at 91, to a vacuum reservoir 92 which is in turn connected to a source of suction such as the inlet manifold 93 of the engine of the vehicle in which the clutch operating mechanism is mounted, the valve being operable to connect the servo-motor to the vacuum reservoir when the clutch is to be released, and at other times connecting the said servo-motor to the atmosphere. The servo-motor 89 is connected to a solenoid-operated valve 94 having a connection to the vacuum reservoir 92 at 95 and a connection to the atmosphere at 96, a valve head 97 being urged, by a spring 98, to close the connection 96, and being moved when the operating solenoid 99 is energised, to open the connection 96 and close the connection 95.

The solenoid 99 is arranged in an electrical circuit including a battery 101, a main switch 102 which may be the ignition switch of the vehicle, a change-over switch 103 arranged to select either one of two parallel conductors, and a further switch 104 in one of the said conductors. The change-over switch 103 is operated by the gear-shift mechanism of the vehicle, and is arranged to select the conductor in which the further switch 104 is arranged when third or top gear is selected, and to select the other conductor when the lower gears are selected, whereas the further switch 104 is connected to the throttle control pedal so as to be closed when the throttle control pedal is in the position to close the engine throttle.

When the ignition switch of the vehicle is in the "off" position, the solenoid is de-energised, and the servo-motor 89 is connected to vacuum so that, provided the vacuum reservoir is evacuated, the clutch is engaged by its springs. When the ignition switch 102 is closed and a gear is selected, the solenoid is energised, and the clutch release bearing 79 is moved to the position in which the clutch is released but can be engaged by centrifugal force. If first or second gear has been selected, the clutch release bearing remains in this position, and the clutch therefore remains under centrifugal control, but if third or top gear is selected, the opening of the throttle valve breaks the electrical circuit and de-energises the solenoid, with the result that the clutch becomes fully engaged by the clutch springs.

It will be understood that the solenoid operated valve used in the arrangement of Figure 6 may be controlled as described with relation to any one of Figures 1 to 4, or may be replaced by a governor operated valve as described with reference to Figure 5.

The throw-out lever, instead of having the position of its fulcrum moved as described with reference to Figure 6, may be connected to the clutch-releasing servo-motor through a link of adjustable length, a servo-motor, controlled in the same manner as the servo-motor 89, being provided to alter the length of the link in the appropriate direction when full engagement of the clutch by the springs is required.

We claim:
1. Clutch operating mechanism for a motor vehicle having a centrifugal clutch which includes a driving plate, a driven plate engageable therewith, a pressure plate engageable with the driven plate, a reaction plate, clutch springs urging the reaction plate toward the pressure plate, centrifugal weights carried by the reaction plate thrust members interposed between said centrifugal weights and said pressure plate, release levers, and strut means through which said release levers act on the reaction plate; said clutch operating mechanism including a release bearing cooperating with the release levers, a servo-motor for moving the release bearing in a direction to compress the clutch springs, a stop means for limiting the stroke of the servo-motor in the direction to extend the clutch springs, spring means supporting the stop means and being strong enough to overcome the clutch springs, in a position such that the clutch is engageable only by operation of the centrifugal weights, power means to retract said stop and allow further extension of the clutch springs being brought into operation by means responsive to the vehicle speed.

2. Clutch operating mechanism for a motor vehicle having a centrifugal clutch which includes a driving plate, a driven plate engageable therewith, a pressure plate engageable with the driven plate, a reaction plate, clutch springs urging the reaction plate toward the pressure plate, centrifugal weights carried by the reaction plate thrust members interposed between said centrifugal weights and said pressure plate, release levers, and strut means through which said release levers act on the reaction plate; said clutch operating mechanism including a release bearing cooperating with the release levers, a servo-motor for moving the release bearing in a direction to compress the clutch springs, connecting the servo-motor to the release bearing, said linkage including a lever having a movable fulcrum, means being provided to hold the said fulcrum in a position such that, when the servo-motor is inoperative the release bearing is held in a position such that the clutch is engageable only by the centrifugal weights, power means being provided to move said fulcrum in such a way that, without movement of the servo-motor, the release bearing is moved to allow further extension of the clutch springs, said power means being brought into operation by means responsive to the vehicle speed.

3. Clutch operating mechanism for a motor vehicle having a centrifugal clutch which includes a driving plate, a driven plate engageable therewith, a pressure plate engageable with the driven plate, a reaction plate, clutch springs urging the reaction plate toward the pressure plate, centrifugal weights carried by the reaction plate thrust members interposed between said centrifugal weights and said pressure plate, release levers, and strut means through which said release levers act on the reaction plate; said clutch operating mechanism including a release bearing cooperating with the release levers, spring means stronger than the clutch springs acting on the release bearing in opposition to the said clutch springs, means determining the position to which the release bearing is urged by said spring means, said position being such that the clutch is engageable only by operation of the centrifugal weights, power means operable to overcome said spring means and allow said release bearing to move so as to permit further extension of said clutch springs and full engagement of the clutch thereby, and means responsive to increasing vehicle speed to bring said power means into operation.

4. Clutch operating mechanism according to claim 3, wherein said last means are responsive to the action of a centrifugal governor driven by the vehicle transmission.

5. Clutch operating mechanism according to claim 3, wherein said last means are responsive to the current produced by an electric generator driven by the vehicle engine.

6. Clutch operating mechanism according to claim 3, wherein said last means are responsive to movement of an engine speed control member.

7. Clutch operating mechanism according to claim 3, wherein gear ratio selection means on the vehicle are coupled to an overriding control device for said last means whereby said means are rendered inoperative only when predetermined gears are selected.

8. Clutch operating mechanism for a motor vehicle according to claim 3, wherein the power means comprise a vacuum actuator controlled by a valve which is itself controlled by the means responsive to the vehicle speed.

9. Clutch operating mechanism for a motor vehicle according to claim 8, wherein the valve is solenoid operated, the solenoid being arranged in an electrical circuit, the flow of current in which is controlled by the means responsive to the vehicle speed.

10. Clutch operating mechanism for a motor vehicle according to claim 9, wherein the electrical circuit includes a generator driven by the vehicle engine and adapted to generate sufficient current to operate the solenoid only when the engine speed exceeds a predetermined minimum.

11. Clutch operating mechanism for a motor vehicle according to claim 9, wherein the electrical circuit includes a battery and a switch controlled by a centrifugal governor adapted to be driven by the vehicle transmission.

12. Clutch operating mechanism for a motor vehicle according to claim 9, wherein the electrical circuit includes a battery and a switch operated by movement of the throttle control pedal of the vehicle.

13. Clutch operating mechanism for a motor vehicle according to claim 8, wherein the valve is mechanically connected to a centrifugal governor so as to be operated thereby.

14. Clutch operating mechanism for a motor vehicle according to claim 12, wherein the electrical circuit also includes a switch adapted to be operated by gear selector means on the vehicle so as to override the speed-responsive means when one or other of certain gears is selected and prevent operation of the power means to further extend the clutch springs.

References Cited in the file of this patent

UNITED STATES PATENTS

| | | |
|---|---|---|
| 2,168,682 | Paine | Aug. 8, 1939 |
| 2,248,377 | Nutt | July 8, 1941 |
| 2,510,042 | Thomas | May 30, 1950 |
| 2,513,521 | Sampietro et al. | July 4, 1950 |
| 2,520,721 | Hupp | Aug. 29, 1950 |
| 2,531,711 | Thomas | Nov. 28, 1950 |